United States Patent [19]

Jung

[11] 4,307,962
[45] Dec. 29, 1981

[54] DETERMINATION OF THE STANDARD COLOR VALUES OF COLORS REPRESENTED ON A COLOR MONITOR

[75] Inventor: Eggert Jung, Schoenberg, Fed. Rep. of Germany

[73] Assignee: Dr. Ing. Rudolf Hell GmbH, Kiel, Fed. Rep. of Germany

[21] Appl. No.: 69,838

[22] Filed: Aug. 27, 1979

[30] Foreign Application Priority Data

Sep. 8, 1978 [DE] Fed. Rep. of Germany ....... 2839187

[51] Int. Cl.³ ............................ G01J 3/50; G03F 3/08
[52] U.S. Cl. ....................................... 356/405; 358/80
[58] Field of Search .............. 356/402, 405, 406, 416; 250/226; 364/526; 358/93, 75, 76, 80

[56] References Cited

U.S. PATENT DOCUMENTS 3,330,904 7/1967 Gebel .............................. 356/405 X

FOREIGN PATENT DOCUMENTS 52-38983 3/1977 Japan ................................... 356/402
52-60676 5/1977 Japan ................................... 356/406

Primary Examiner—F. L. Evans
Attorney, Agent, or Firm—Brisebois & Kruger

[57] ABSTRACT

The invention relates to a method of determining the standard color data of colors represented on a color monitor. Within a color represented on the color monitor there is fixed a measurement area in which the color measurement data are determined. From the color measurement data there are calculated the corresponding standard color data of the color selected by the measurement area, taking into account the tube characteristics and the standard color data of the individual phosphors of the color monitor.

The accuracy of the determination of standard color data can be increased by multiple measurement within the measurement area.

The calculated standard color data are, for example, the starting quantities for a color mixture calculation by means of a color formula computer.

9 Claims, 5 Drawing Figures

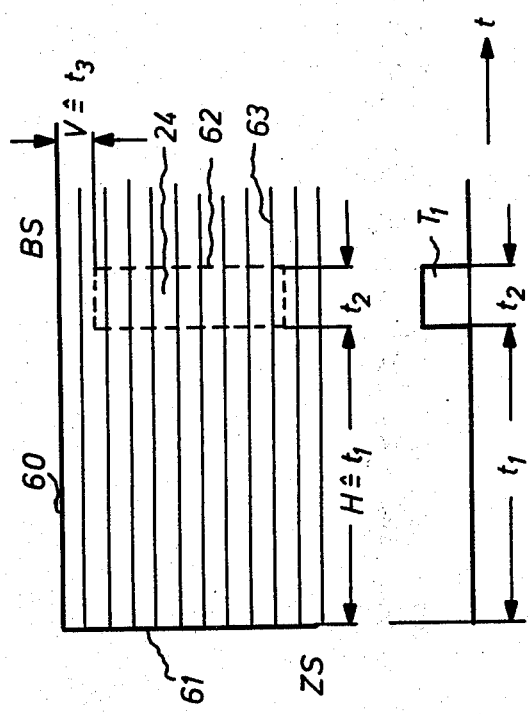
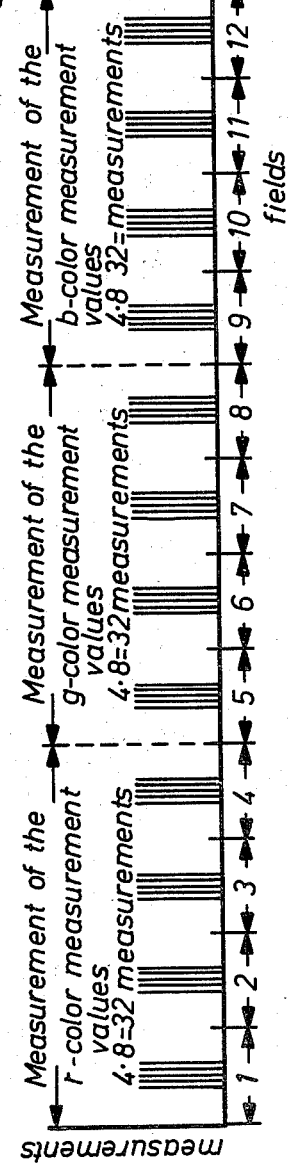
Fig. 3a
Fig. 3b
Fig. 4

DETERMINATION OF THE STANDARD COLOR VALUES OF COLORS REPRESENTED ON A COLOR MONITOR

BACKGROUND OF THE INVENTION

The present invention relates to methods of determining the standard colour values of colours represented on a colour monitor, of the kind in which the colour monitor is driven by colour measurement value signals, and to apparatus for carrying the method into effect. The determined standard colour values form the starting quantities for calculating the mixing proportions of the colours.

Whereas the multi-colour printing each colour is produced by printing various proportions of the separation colours (magenta, cyan, yellow) one on top of the other, the clours to be printed in decoration, packaging or textile printing are compounded prior to the printing process in accordance with colour originals or specimen designs and are then transferred separately to the printing medium (full area/printing).

Determination of the colour components (the colour formula) constitutes a considerable problem. For each given colour original or model the colour formula should be so calculated that when the colour is imitated the same colour impression is created as in the case of the colour original.

To determine the components of the mixture, use is made, for example, of a colour mixing table or chart, in which the proportions of primary colours which are required for compounding are given for every specimen colour.

The colour original to be printed must be compared with the individual specimen colours of the colour mixing table, an operation which presupposes a very reliable colour gauging ability. If no correspondence of colour can be established when the visual comparison is made, the colour formula must be determined empirically by colour mixing and application, which is very time-consuming.

There are already known, however, so-called colour-formula computers in the form of process computers, which calculate the necessary colour formula as proportions of primary colours from the data fed in.

The specific spectral data of any desired set of primary colours are fed into the colour-formula computer as fixed input values. The colour original for the colour to be compounded must be measured colorimetrically by means of a colour measuring instrument by determining the standard colour values (hues) or the spectral reflectance data. From the standard color values and the specific spectral data of the primary colours, the colour-formula computer then determines the necessary colour formula for a certain type of light.

This method also has the disadvantage that the very accurate color sample must first be available or prepared in order to be able to measure the standard colour values.

Moreover, the possibility of being able to evaluate the colour original to be printed as regards the arrangement of the design and the colour composition of the various coloured areas is lacking.

Moreover, so-called colour-separating systems for colour-true simulation of printing processes are known, by means of which visual evaluation and correction of the final product is rendered possible.

In such a colour-separating apparatus an original is scanned as in television by means of a colour camera and re-recorded on a colour monitor. The colour signals produced during scanning are converted into corrected colour separation signals in a colour computer. A printing simulating computer connected at the output end of the colour computer and which specially takes into account the printing parameters for multi-colour printing transforms the corrected colour separation signals into control signals for the colour monitor in such manner that the representation of the original on the screen of the colour monitor creates the same colour impression as multi-colour printing.

It is true that with these colour-separating systems colour originals and specimen designs for decoration, textile and packaging printing can also be examined for arrangement or form and colour, but even these systems do not solve the problem of indicating the standard colour values for the colours represented on the colour monitor for the purpose of calculating the colour formula. Since the known colour-separating systems are specially designed for the purposes of multi-colour printing, these systems also do not supply any signals from which the standard colour values could be derived.

It is true that colour correction can also be carried out with the known colour-separating systems, but this is operative over the whole of the picture screen; selective colour correction for different coloured areas disposed side by side, such as occur in the colour originals for the types of printing mentioned, is not possible however.

It is therefore an object of the invention to provide a method of and an apparatus for determining the standard colour values of colours represented on a colour monitor without a visual comparison of colours having to take place and wherein the standard colour values form the starting quantities for a colour mixture calculation for the colours represented.

SUMMARY OF THE INVENTION

Accordingly, in a method of determining the standard colour values of colours represented on a colour monitor exhibiting a line structure in operation, of the kind in which the colour monitor is driven by colour measurement value signals, the invention consists in that a measurement area is fixed within a represented coloured area and the colour measurement value triplets associated with said measurement area are determined and converted into the standard colour value triplets of the colour selected by the measurement area, taking into account the tube characteristics and the standard colour value triplets of the individual phosphors of said colour monitor.

The invention also consists in apparatus for carrying out the method hereinabove set forth, including a signal source for obtaining colour measurement value signals and a colour monitor arranged to be driven by said colour measurement value signals, for representing the colours, said apparatus comprising a control means for producing a movable light spot on said colour monitor, said control means being operative to fix a measurement area within a represented coloured area and for generating control signals for the measuring process, an arrangement to which said colour measurement value signals and said control signals are caused to be applied and for determining the colour measurement value triplet associated with said measurement area, and a transformation stage connected to said arrangement for converting the determined colour measurement value triplet into the standard colour value triplet of the colour selected by said measurement area, taking into account the tube characteristics and the standard colour value triplets of the individual phosphors of said colour monitor.

BRIEF DESCRIPTION OF THE DRAWINGS

In order that the invention may be more clearly understood, reference will now be made to the accompanying drawings, which show certain embodiments thereof by way of example and in which:

FIG. 3 is a graphic representation,

FIG. 4 is a time diagram, and

DETAILED DESCRIPTION OF PREFERRED EMBODIMENTS

Figure 1:
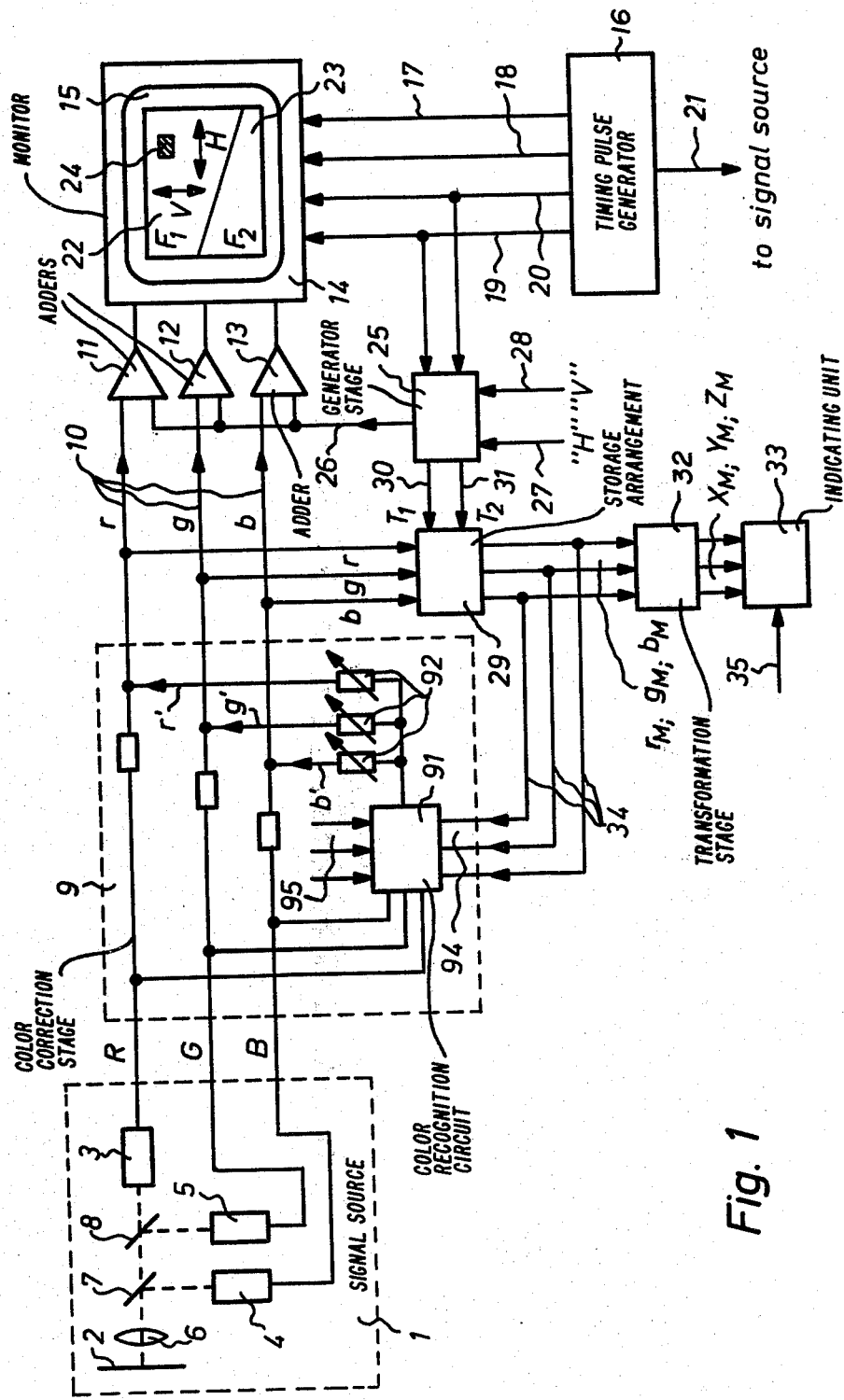
FIG. 1 shows an apparatus for determining standard colour values.

Referring now to the drawings, FIG. 1 shows a basic apparatus for determining the standard colour values or porportions of standard colour values of a colour represented on a colour monitor. These standard colour values form the starting quantities for a colour-formula calculation, i.e. for calculating the mixing proportions of primary colours in the colour to be compounded which is identical with the colour represented on the monitor.

In the embodiment shown there is provided as a signal source 1 an electronic colour camera which scans a colour original 2 point-by-point and line-by-line as in television. The colour camera comprises three image pick-up tubes 3, 4 and 5 of different spectral sensitivity. The scanning light from the colour original 2 is split up into three partial beams by means of an objective 6 and two partially light-transmitting mirrors 7 and 8. The partial beams fall on the image pick-up tubes 3, 4 and 5 which convert the received light optoelectronically into the three colour measurement value signals R, G and B (red, green and blue).

The colour measurement value signals R, G and B can be modified in an adjustable colour-correction stage 9. The colour signals r, g and b obtained are supplied on leads 10 and via adders 11, 12 and 13 to a colour monitor 14, on the screen 15 of which the scanned colour original 2 is recorded. The recording is carried out, for example, by the interlaced scanning method with 50 fields per second in order to produce a flicker-free image. A timing pulse generator 16 controls the scanning and recording and by the technique which is customary in television, generates horizontal and vertical deflection signals on leads 17 and 18, line start pulses (ZS) and image start pulses (BS) on lines 19 and 20 and a control timing pulse on another lead 21 for synchronizing the signal score 1. Such timing pulse generators are known to those skilled in the art, so that a more detailed description is unnecessary.

On the screen 15 of the colour monitor 14 there is imaged, for example, a colour original 2 which has two different coloured areas 22 and 23 disposed adjacent one another and having the colours $F_1$ and $F_2$.

To mark a measurement area within the coloured areas 22 and 23, a movable measuring mark 24, which is produced in a generator stage 25, is masked into the screen 15 in the form of a light spot. The area of the light spot corresponds to the measurement area. The generator stage 25 is controlled by the line start pulses (ZS) on the line 19 and the image start pulses (BS) on the line 20. In the time interval in which the recording electron beams sweep over the selected measurement area, the generator stage 25 produces a constant signal value on a lead 26. This constant signal value is superimposed on the colour measurement value signals r, g and b by means of the adders 11, 12 and 13, so that the three electron beam generating systems of the colour monitor 14 are switched on simultaneously with the same luminous intensity, whereby the "white" measuring mark 24 is produced.

The shifting of the measuring mark 24 in the horizontal and vertical direction over the surface of the screen is controlled by two signals (H:V) at the inputs 27 and 28 of the generator stage 25. The signals (H:V) may be produced, for example, by means of a mechanical coordinate control lever. The generator stage 25 is described is detail hereinafter with reference to FIG. 2.

If desired, the measuring mark 24 may alternatively be produced by means of a cursor.

With the aid of the movable measuring mark 24, the measurement area is marked on the screen 15 within a colour $F_M$ whose standard colour values or hues $X_M$, $Y_M$ and $Z_M$ are to be determined.

For determination of the colour measurement value triplets $r_M$, $g_M$ and $b_M$ which belong to the colours marked by the measurement area, a storage arrangement 29 is provided. The storage arrangement 29 is controlled by two timing pulse sequences $T_1$ and $T_2$ on leads 30 and 31 which are generated in the generator stage 25. The storage arrangement 29 filters the colour measurement value triplets $r_M$, $g_M$ and $b_M$ associated with the measurement area out of the colour measurement value signal sequence r, g and b arriving continuously on the leads 10 and stores these values.

According to a further development of the invention, in order to increase the accuracy and reliability of measurement, a multiple measurement is effected within the measurement area, together with an addition and subsequent formation of a mean value for determining the colour measurement value triplets $r_M$, $g_M$ and $b_M$ of the selected colour $F_M$.

In this way certain colour differences within the measurement area, which have arisen, for example, as a result of the television scanning of the colour original 2, can also be taken into account.

In the embodiment, for each colour value of the selected colour $F_M$, eight measurements per field are carried out at any given time within four fields, that is 32 measurements for one colour measurement value, and the mean value is formed therefrom. Determination of the additional colour measurement values of the selected colour $F_M$ takes place in succession in time, so that a measuring cycle is completed in each case after 12 fields.

The storage arrangement 29 is described in greater detail with reference to FIG. 2.

In a transformation stage 32 connected at the output side of the storage arrangement 29, the stored colour measurement value triplets $r_M$, $g_M$ and $b_M$ of the selected colour $F_M$ are converted into the desired standard colour values $X_M$, $Y_M$ and $Z_M$ taking into account the non-linear characteristics f(r), f(g) and f(b) of the electron beam generating systems of the colour monitor 14 and the three standard colour value triplets ($X_R$, $Y_R$, $Z_R$); ($X_G$, $Y_G$, $Z_G$); ($X_B$, $Y_B$, $Z_B$) of the individual "red", "green" and "blue" phosphors of the screen 15.

The convertion is effected taking account of the principles of additive colour mixing in accordance with the equations:

$$X_M = f(r_M) \cdot X_R + f(g_M) \cdot X_G + f(b_M) \cdot X_B$$

$$Y_M = f(r_M) \cdot Y_R + f(g_M) \cdot Y_G + f(b_M) \cdot Y_B$$

$$Z_M = f(r_M) \cdot Z_R + f(g_M) \cdot Z_G + f(b_M) \cdot Z_B$$

The standard colour value triplets of the individual phosphors may be measured, for example, by means of a suitable colour measuring instrument directly on the screen 15 on a single occasion for each colour monitor 14 by driving the R, G and B electron beam generating systems in succession by means of those r, g and b values by which "white" is also produced on the screen 15.

Likewise, the non-linear characteristics of the colour monitor 14 can be determined by a luminous-intensity measurement in dependence upon the r, g, b values.

It is also possible to employ the tube characteristics and characteristics data of the phosphors which are given by the manufacturer of the colour monitors, if these are available with sufficient accuracy.

The standard colour values $X_M$, $Y_M$ and $Z_M$, obtained in the transformation stage 32, which represent the starting values for calculating the colour components of the colour $F_M$ to be compounded, are transferred to a unit 33.

The unit 33 may be an indicating unit, a storage medium or else, preferably, a colour formula computer. This colour formula computer issues directly the mixing proportions, which can be added to the colour original 2 as instructions for preparing the work.

Such colour formula computers are described, for example, in the journal "Die Farbe", Volume 14, 1965, pages 80–90, published by Musterschmidt-Verlag, Göttingen.

The apparatus for determining standard colour values described above operates in the following manner:

The Operator will first evaluate the conformation of the colour original represented on the screen 15 and, if necessary, will carry out certain geometrical restructuring operations. Preferably, a white frame will be masked into, or superimposed on, the screen 15 of the colour monitor 14, the type of light of the frame being identical with the type of light under which the final product is observed (e.g. 5000K or D 6500). In this way, colour evaluation errors by reason of colour changes are avoided.

Then there take place evaluation and correction of the colouring by colour modifications or transformations by means of the selective colour correction stage 9.

The colour correction is carried out in the following way.

The selective colour correction stage 9 contains a colour recognition circuit 91 which is preferably constructed in accordance with U.S. Patent specification Ser. No. 807,507. The colour recognition circuit 91 selects from the plurality of offered colour measurement value signals R,G and B those colour measurement value triplets which are located within the limits of a prescribed colour recognition space within the colour space and then produces an output signal. The colour recognition space is characterised by the position of a key colour $r_0$, $g_0$ and $b_0$ and by shape, extent and orientation in the colour space. The output signal of the colour recognition circuit 91 is at its maximum at the key colour and is equal to zero at the boundaries of the colour recognition space. Three different correction signals r' g' and b' are derived from the output signal of the colour recognition circuit 91 by means of potentiometers 92 and are superimposed on the colour measurement value signals. In this way, the effectiveness of the correction signals is at the maximum for the key colour $r_0$, $g_0$ and $b_0$ and decreases towards the boundaries of the colour recognition space, whereby the selective colour correction is achieved. To carry out selective colour correction, the operator will first position the measuring mark 24 on the coloured area 22. The colour measurement value triplets $r_1$, $g_1$ and $b_1$ of the colour $F_1$ defined by the measuring mark 24 are stored in the storage arrangement 29 as described and are supplied via leads 34 and inputs 94 to the colour recognition circuit 91 in the colour correction stage 9 as key colour $r_{01}$, $g_{01}$ and $b_{01}$ for the colour correction.

Advantageously, the colour recognition space can be so altered by adjustment of its R,G and B coordinates at the programming inputs 95 of the colour recognition circuit 91 that the limits of the range of action of the colour correction coincide exactly with the geometrical contours of the coloured area 22.

In this way, the colour $F_1$ of the coloured area 22 can be corrected without the colour $F_2$ of the other coloured area 23 changing, whereby the adjustment of the colours to one another and colour placings are particularly facilitated.

After the colour correction for the coloured area 22, the associated standard colour values $X_{M1}$, $Y_{M1}$ and $Z_{M1}$ of the coloured area 22, which are available at the output of the transformation stage 32, can be transferred by a command on a lead 35 to the unit 33.

The described operations are thereafter carried out for the coloured area 23 and the determined standard colour values $X_{M2}$, $Y_{M2}$ and $Z_{M2}$ of the colour $F_2$ are transferred to the unit 33.

If, for example, only one colour correction stage at a time is to be represented on the colour monitor 14, the colour correction stage 9 can be dispensed with and replaced by three potentiometers for varying the R, G and B colour measurement values. In this case multiple measurement can also be dispensed with.

The signal source 1 may also be a digital data source. In this case, the colour original 2 has already been scanned by means of a colour camera prior to representation on the colour monitor 14, the colour measurement value signals R, G and B have been digitized and they have been filed in an image store. To represent the colour original 2 on the screen 15 of the colour monitor 14, the stored image data is transferred to an image repeating store and read out cyclically therefrom 50 times per second to produce a still image and supplied to the colour monitor 14.

The conversion of the image data into the analogue driving signals for the colour monitor 14 may take place both at the output of the signal source 1 and at the input of the colour monitor 14. In the event of the digital-to-analogue conversion already taking place at the output of the signal source 1, all the described operations between the signal source 1 and the colour monitor 14 are carried out in analogue form. In the event of the digital-to-analogue conversion taking place only at the input of the colour monitor 14, however, all the described operations, including the colour correction, may also be carried out in purely digital form. It would also be conceivable to carry out the described operations by a so-called hybrid technique, for example in accordance with the specification of co-pending Patent Application Ser. No. 912,097.

In this technique, control units which are drivable digitally, but exercise their effect in analogue form, are employed. Thus, for example, the correction quantities for the colour correction stage 9 and for the transformation stage 32 may be given in digital form. Affecting or control of the colour signals then, however, takes place in analogue form in accordance with the correction data.

The apparatus according to the invention may also be used with known colour separating systems.

The invention is not limited to determination of the standard colour values for printing inks. It may be applied wherever colours are to be compounded from primary colours.

Figure 2:
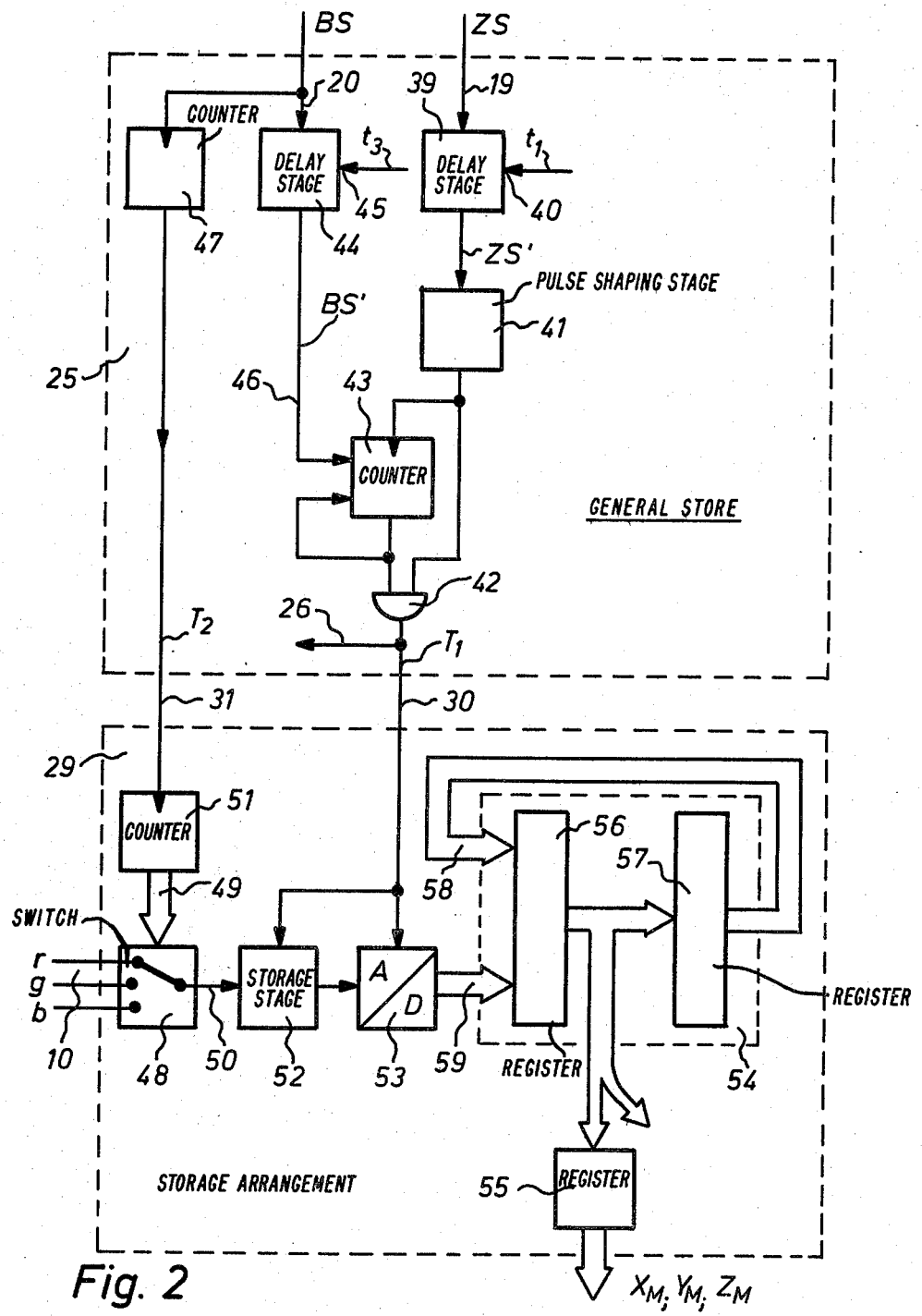
FIG. 2 shows an embodiment of a generator stage and of a storage arrangement.

FIG. 2 shows detailed embodiments of the generator stage 25 and the storage arrangement 29.

Generator stage 25

The line starts pulses (ZS) generated by the timing pulse generator 16, which appear once in every line on the lead 19, are delayed by the time $t_1$ in an adjustable delay stage 39. The delay time $t_1$ is adjusted at a programming input 40 of the delay stage 39 and corresponds to the horizontal shifting (H) of the measuring mark 24 on the screen 15 of the colour monitor 14 in FIG. 1.

The delayed line start pulses ZS' are converted in a pulse shaping stage 41 connected at the output side of the delay stage 39 into the timing pulse sequence $T_1$ with a defined pulse duration $t_2$ and are supplied to an AND gate 42. The pulse duration $t_2$ corresponds to the width of the measuring mark 24 or of the measurement area in the horizontal direction.

The timing pulse sequence $T_1$ is counted into a pulse counter 43, which is pre-programmed to "8". The output signal of the pulse counter 43 controls the AND gate 42.

The image start pulses BS obtained from the timing pulse generator 16, which appear at any given time for each field on the lead 20, are delayed by a time $t_3$ by means of another adjustable delay stage 44. The time delay $t_3$ is again adjustable at a programming input 45 and corresponds to the vertical shifting (V) of the measuring mark 24.

The delayed image start pulses BS' on a lead 46 start the pulse counter 43, whereby the AND gate 42 is enabled for the pulse timing sequence $T_1$.

In each case after "8" counted-in timing pulses of the timing pulse sequence $T_1$, the pulse counter 43 is stopped and and AND gate 42 is inhibited for the pulse sequence $T_1$. In this way, eight timing pulses $T_1$ are produced per field in eight successive lines, these being each delayed from the beginning of the line by the time $t_1$.

These timing pulses $T_1$ control via the lead 26 the production of the measuring mark 24 on the screen 15. The measuring mark 24 of the marked measurement area therefore spans eight lines in the vertical direction.

The timing pulses $T_1$ also control, however, via the lead 30, the multiple measurement of the colour measurement values in the storage arrangement 29.

The image start pulses BS on the lead 20 are moreover counted into an image counter 47, which is preset to "4" in the embodiment, so that in each case after four fields another timing pulse $T_2$ appears at its output on the lead 31 for the multiple measurement in the storage arrangement 29.

Storage arrangement 29

The colour measurement value signals r, g and b to be measured arrive on the leads 10 at a change-over switch 48, which is symbolized as a mechanical changeover switch in the embodiment. The change-over switch 48 has the function of switching the colour measurement value signals r, g and b on to an output lead 50 in succession in dependence upon control data at the inputs 49 of the change-over switch 48.

An analogue/multiplexor, for example of Type DG 506 as supplied by the Siliconix Company, may be employed as the change-over switch 48. The analogue multiplexor employs MOS field effect transistors in the role of switches, which can be driven by an integrated BCD decimal decoder. The BCD inputs of the decoder correspond to the inputs 49 of the change-over switch 48.

The timing pulses $T_2$ generated by the generator stage 25 are counted into a counter 51 preset at the number "3", which supplies at its output the control data for the change-over switch 48.

Since a timing pulse $T_2$ is put into the counter 51 after every four fields, the control data for the change-over switch 48 also changes after every four fields. In this way, the individual colour measurement value signals r, g and b are switched cyclically onto the output lead 50 after every four fields.

For measuring the individual colour measurement value signals on the output lead 50, an analogue storage stage 52 in the form of a sample-and-hold circuit, and A/D converter 53 for converting the analogue stored values into, for example, 9-bit words, an adding stage 54 and a storage register 55 are connected on the output side of the change-over switch 48. The storage stage 52 and the A/D converter 53 are controlled by the timing pulses $T_1$ on the lead 30. The adding stage 54 consists of the adder proper 56 and a register 57. The information A which has reached the first input 59 of the adder 56 is taken over into the register 57 and is applied simultaneously as term of a sum at the second input 58 of the adder 56. When the second item of information B is present at the input 59, the two items of information are added together and the sum information A+B is taken over into the register 57. This sum information A+B is also applied, on the other hand, at the second input 58 of the adder 56, so that when a third item of information C is present the sum information A+B+C is formed.

Determination of the colour measurement value takes place as follows:

For example, let the colour measurement value signals r be switched on to the output lead 50.

During the first field, eight colour measurement values r which are associated with the marked measurement area and controlled by the timing pulses $T_1$ are stored in serial sequence in the storage stage 52, converted into 9-bit words in the A/D converter 53 and added together in the adding stage 54.

During the second, third and fourth fields, eight colour measurement values r are again evaluated and added together in each case, so that after the fourth field $4 \times 8 = 32$ colour measurements values r have been added together as a 9-bit word in the adding stage 54. Formation of the mean value takes place by division by 32, which is effected by discarding the five low-value bits of the 9-bit word. The remaining 4-bit word is the desired measurement result for the colour measurement value r of the selected colour, which value is taken over in parallel into the storage register 55.

In the same way, the colour measurement value g is produced as a 4-bit word during the fifth to eighth field and the colour measurement value b is produced as a 4-bit word during the ninth to twelfth field and these values are taken over into the storage register 55 in serial sequence.

FIG. 3 is a graphic representation of the mode of operation of the described apparatus.

FIG. 3a shows a portion of the screen 15 of the colour monitor 14. The horizontal line 60 is intended to indicate the start of the image at the upper edge of the screen 15 and the vertical line 61 is intended to indicate the line start at the left edge of the screen 15. These lines 60 and 61 form the reference system for the shift coordinates H and V of the measuring mark 24, "H" corresponding to the time $t_1$ and "V" to the time $t_3$. The measuring mark 24 or the measurement area is marked by the dash line 62. The extent of the measuring mark 24 in the horizontal direction corresponds to the duration $t_2$ of the timing pulse $T_1$, which is indicated in the pulse diagram of FIG. 3b. In the vertical direction, the measuring mark 24 spans eight lines 63 of the monitor image, in each of which a timing pulse $T_1$ is generated.

FIG. 4 illustrates in another diagram the course in time of the multiple measurement for the three colour measurement values within 12 fields of the colour monitor 14.

Within the marked measurement area 24 (FIG. 3a), eight measurements take place during the first field, as described these being indicated by the perpendicular lines 64. After four fields, 4×8=32 measurements have been carried out for the colour measurement value r. During the next four fields, 32 measurements are likewise made for the colour measurement value g and in the following four fields the corresponding 32 measurements are made for the colour measurement value b. As described, from the 32 measured values for each of the three colour measurement values the desired colour measurement values $r_M$, $g_M$ and $b_M$ of the selected colour $F_M$ are obtained by mean-value formation for further processing.

Figure 5:
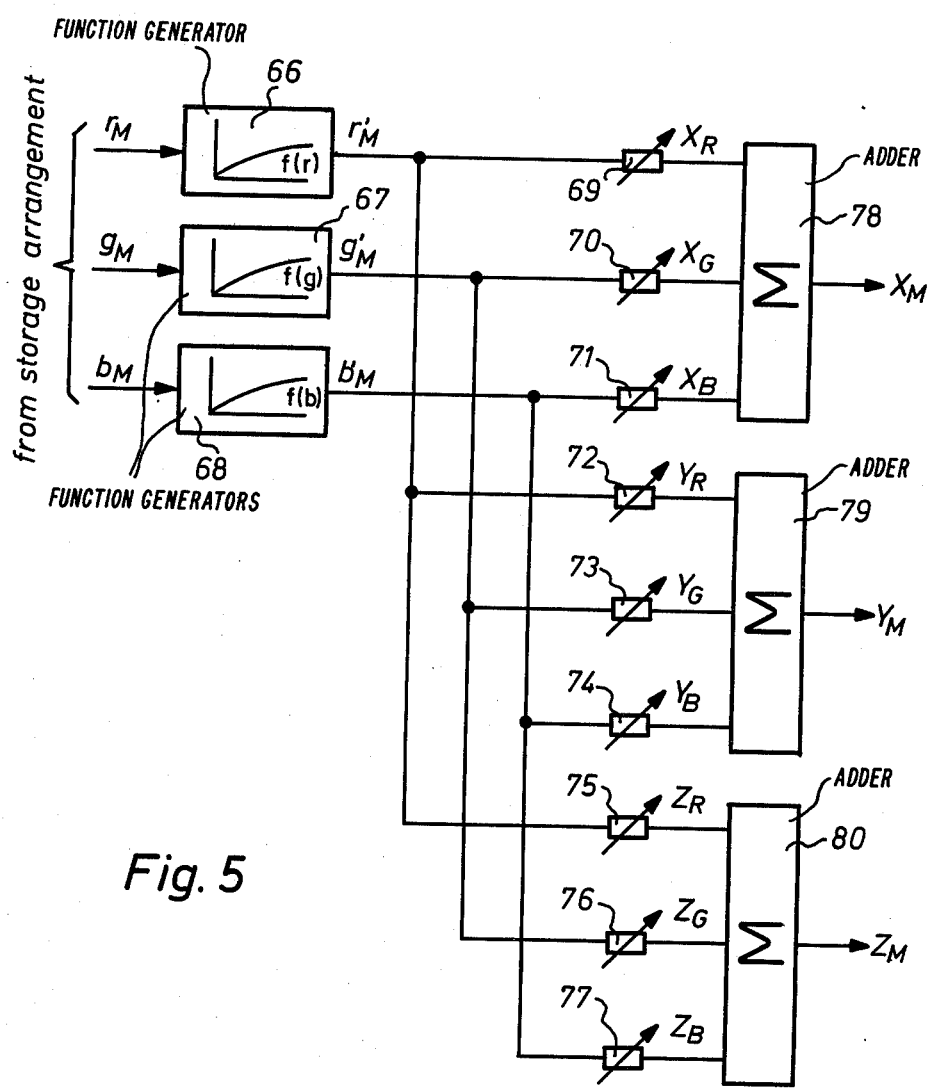
FIG. 5 shows an embodiment of a transformation stage.

FIG. 5 shows an embodiment of the transformation stage 32, by means of which the equations given in connection with FIG. 1 for determining the standard colour values $X_M$, $Y_M$ and $Z_M$ from the measured colour values $r_M$, $g_M$ and $b_M$ are carried into effect.

The transformation stage 32 comprises firstly three function generators 66, 67 and 68, by means of which the non-linear characteristics of the colour monitor 14 are compensated in order to obtain a linear gradation of light on the screen 15.

The function generators 66, 67 and 68 are constructed in known manner from resistor-diode networks which as a rule are arranged in the negative feedback branches of operational amplifiers.

The standard colour values $(X_R, Y_R, Z_R)$; $(X_G, Y_G, Z_G)$; $(X_B, Y_B, Z_B)$ of the individual phosphors, which are measured a sigle time for each colour monitor, are set on potentiometers 69 to 77.

The output signals $r'_M$, $g'_M$ and $b'_M$ of the function generators 66, 67 and 68 are each supplied to three adders 78, 79 and 80 via the potentiometers 69 to 77, which are associated equation-wise.

The output signals of the adders 78, 79 and 80 form the desired standard colour values $X_M$, $Y_M$ and $Z_M$. It is within the scope of the invention that the transformation stage 32 also determines the corresponding standard colour value proportions $x_M$, $y_M$ and $z_M$.

If the equations in the transformation stage 32 are to be taken into effect digitally, the function generators are preferably constructed from programmable fixed-value memories (PROMs), in which the data of the characteristics of the colour monitor is stored in the form of tables. Likewise, the standard colour values of the individual phosphors could be stored in such fixed-value memories. Multiplication and addition of the stored values could likewise be carried out digitally.

I claim:

1. A method of generating standard tristimulus values, of colors recorded line-by-line on a screen of a color monitor by video color signals representing the brightness on said screen, the screen having individual phosphors, the method comprising the steps of:
    (a) determining the standard tristimulus values of the individual phosphors of the screen;
    (b) determining the functional relation between brightness and video color signals for said color monitor;
    (c) defining a measurement area within a recorded color on said screen;
    (d) determining the tristimulus values of the color selected by said measurement area in at least one measuring point within said area by sampling the corresponding video color signals values; and
    (e) converting the tristimulus values of the selected color into the corresponding standard tristimulus values taking into account the functional brightness relation and the standard tristimulus values of the individual phosphors.

2. A method according to claim 1, wherein said step of converting the determined tristimulus values of the selected color into the corresponding standard tristimulus values $(X_M, Y_M, Z_M)$ is carried out in accordance with the expressions:

$$X_M = f(r_M) \cdot X_R + f(g_M) \cdot X_G + f(b_M) \cdot X_B$$

$$Y_M = f(r_M) \cdot Y_R + f(g_M) \cdot Y_G + f(b_M) \cdot Y_B$$

$$Z_M = f(r_M) \cdot Z_R + f(g_M) \cdot Z_G + f(b_M) \cdot Z_B$$

where:
  $r_M$, $g_M$ and $b_M$ are the determined tristimulus values of the selected color;
wherein:
  f(r), f(g) and f(b) represent the functional relation between the brightness and the video color signals; and
  $(X_R, Y_R, Z_R)$, $(X_G, Y_G, Z_G)$ and $(X_B, Y_B, Z_B)$ represent the standard tristimulus values of the individual phosphors of the screen.

3. A method according to claim 1 further comprising indicating said measurement area by a light spot movable on the screen of the color monitor.

4. A method according to claim 1, wherein said step of determining the tristimulus values of the color selected by said measurement area comprises determining the tristimulus values of the color in a number of measuring points within said measurement area, and deriving representative tristimulus values from the tristimulus values of said number of measuring points.

5. A method according to claim 1, the step of defining a measurement area comprises defining an area perpendicular to the direction of the recording lines and encompassing a plurality of recording lines, and sampling the corresponding video color signal values on a measuring point of each recording line of said plurality of recording lines.

6. A method according to claim 1, wherein the sampling of the tristimulus values in the individual measuring points takes place in succession in time.

7. A method according to claim 1, wherein the tristimulus values of a color selected by said measurement area are sampled in succession in time.

8. A method according to claim 1, wherein the tristimulus values of a measuring point are sampled repeatedly during successive frames of said monitor, and wherein the repeatedly sampled tristimulus values of a measuring point are added and the representative tristimulus values of said measuring point are derived by forming mean values.

9. A method according to claim 1, wherein the tristimulus values of each measuring point within said measuring area are added, and wherein the representative tristimulus values of said measuring area are derived by forming mean values.

* * * * *